United States Patent [19]
Kirchberger et al.

[11] 3,990,388
[45] Nov. 9, 1976

[54] BATTERY PANEL TRANSFER APPARATUS

[75] Inventors: Walter Carl Kirchberger, Menomonee Falls; Daniel Orlando, New Berlin; Neal Charles Eriksson, Milwaukee, all of Wis.

[73] Assignee: Globe-Union Inc., Milwaukee, Wis.

[22] Filed: May 30, 1975

[21] Appl. No.: 582,095

[52] U.S. Cl. .................... 118/6; 118/58; 118/38; 198/575
[51] Int. Cl.² ........................... B05C 13/00
[58] Field of Search ............ 118/6, 37, 239, 58, 118/38; 198/34, 76, 37

[56] References Cited
UNITED STATES PATENTS

| | | | |
|---|---|---|---|
| 2,883,036 | 4/1959 | Fox et al. | 198/76 X |
| 3,719,267 | 3/1973 | Reist et al. | 198/76 |
| 3,747,560 | 7/1973 | Roberts et al. | 118/230 X |
| 3,861,351 | 1/1975 | Bonwit et al. | 118/6 |

Primary Examiner—John P. McIntosh
Attorney, Agent, or Firm—James L. Kirschnik; John Phillip Ryan

[57] ABSTRACT

Apparatus for transferring freshly pasted battery panels from a battery grid paster and oven to a slitting device while supporting the panels in a generally horizontal altitude. The apparatus includes a first sensing device for detecting the entry of individual battery grid panels into a pasting machine, a second sensing device for detecting the position of the pasted panels as they pass through the oven, and a third sensing device for detecting the position of transfer lugs on a conveyor mechanism which receives the pasted panels after leaving the oven. Signals generated by the sensing devices are directed to a control system for adjusting the speed of the conveyor mechanism so that the conveyor lugs for engaging the battery panels are correctly positioned for engaging the panels from the oven.

27 Claims, 11 Drawing Figures

BATTERY PANEL TRANSFER APPARATUS

BACKGROUND OF THE INVENTION

This invention relates to apparatus for use in the manufacture of storage batteries in general, and in particular for use in the manufacture of lead-acid storage batteries such as are commonly used in automobiles and referred to as starting, lighting and ignition or SLI batteries. Conventional lead-acid storage batteries generally comprise one or more individual cells, each of which contain two or more battery plates which are separated by thin, porous separators. The individual battery plates within each cell comprise a conductive supporting grid structure which is generally made of lead or a lead alloy. The grids contain and support an active battery paste material consisting of a mixture of lead oxide and dilute sulfuric acid.

In the manufacture of lead-acid storage batteries, unpasted grids are conventionally fed through a pasting machine which applies the lead paste to the grids. It is also common practice to cast the grids in pairs which are joined along one edge and must be later separated. After pasting of the grid pairs, the pasted grids or panels pass along a conveyor through a drying oven after which they are then transferred to a slitting mechanism for separating the panels into battery plates. In conventional operations, it has been the practice to support the panels horizontally through the pasting and drying operations after which the panels are fed to a storage sump area in which the panels are supported in a vertical position. From the sump area the pasted panels are individually fed to a conveyor leading to a slitter which separates the panels into individual battery plates. The reason for the vertical orientation of the panels in the sump area is that the slitting operation often does not keep pace with the rate of panels being processed through the pasting and drying operations. This is because there are often jams occurring in the slitter operation particularly at the point of transfer from the vertical position of the panels to a horizontal position for feeding through the slitter. Additionally, much scrap and breakage of the panels occurs when they are initially oriented vertically. Naturally it would be highly desirable to coordinate the slitting, pasting and drying operations so that there would be a continuous flow of panels during all phases of the operation.

It has been found that it is impractical to mechanically synchronize transfer of panels from the point of feeding grid panels into a paster, through a drying oven and into a slitter. This is due to a number of factors well known in the art. For example, if a single conveyor were used, it would be subjected to extremely harsh operating conditions if it extended through a drying oven as well as into a paster and a slitter. Thus, design and maintenance considerations would be prohibitive. Also, in the event of a shut down of such a system for any reason, such as jams or delays, pasted panels would be stopped within the oven for extended periods which could damage them beyond use. Finally, conventional panel processing machinery is often driven by electrical induction motors whose speed varies with loads imposed whereby individual machines are not easily mechanically coordinated due to normal speed variations of the motors.

Another drawback to the conventional transfer mechanisms wherein the pasted panels are, at sometime during drying and slitting, oriented in a vertical position, is that batteries are presently being made with thinner and thinner battery grids. This is because battery capacity is directly related to the number of plates per battery cell. By utilizing thinner grids a greater number of plates may be included within the same size battery cells. Conventional transfer devices are unable to handle the thinner panels which are relatively fragile and easily bent or broken especially when transferred from a horizontal to vertical or vertical to horizontal position. By continuously handling the panels horizontally, the panels may receive more support throughout the manufacturing process.

SUMMARY OF THE INVENTION

It is an object of the invention to provide an apparatus for horizontally transferring battery panels from a source to a destination for further processing.

It is a further object of the invention to provide a transfer apparatus for battery panels having control means for coordinating the speed of the transfer mechanism with rate of movement of panels into the transfer mechanism.

Other objects and advantages of the invention will become apparent from the description of the preferred embodiment which follows.

The invention basically comprises a transfer mechanism for receiving the pasted panels from a moving source and for delivering the panels to a destination point. The transfer mechanism includes a conveyor and a controller is provided for coordinating the speed of movement of the transfer conveyor relative to the speed of panels received from the source. The controller includes sensors for detecting the relative position of panels at the source of panels and for sensing the position of transfer lugs on the transfer conveyor. Means are provided to adjust the speed of the transfer conveyor in response to signals from the sensors.

DESCRIPTION OF THE DRAWINGS

FIG. 1 shows a typical battery panel which the present invention is concerned with;

DESCRIPTION OF A PREFERRED EMBODIMENT

Figure 1:
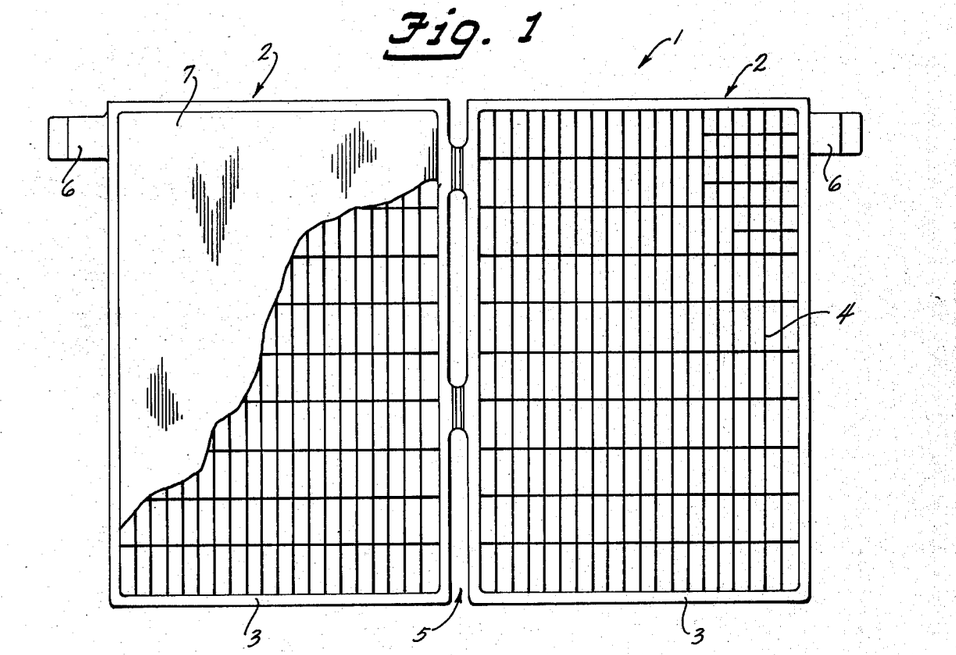

A typical battery grid panel 1 with which the present invention is concerned is seen in FIG. 1. The panel 1 includes a pair of grids 2 comprising a frame 3 and lattice work 4 which are typically made of molded lead or a lead alloy. The grids 2 are joined along one edge 5 at which point they are subsequently separated by a slitting mechanism as will be described later. Each grid has an integral lug 6 formed thereon on the side opposite edge 5. The grid panel 1 is adapted to receive a coating of battery paste 7 which is maintained in place on the lattice work 4. After pasting the grid panel is referred to as a pasted panel and after separation, the individual panel halves are called battery plates. Hereinafter, the unpasted grid panel will be referred to merely as a grid and the pasted panel referred to as a panel.

Figure 2:
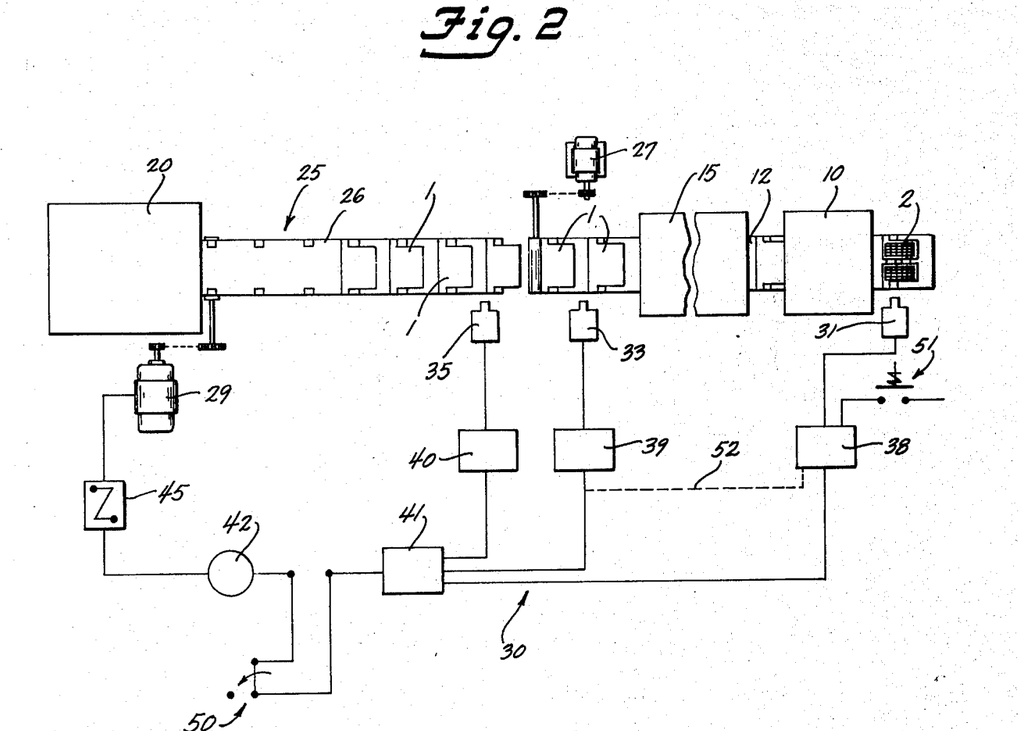
FIG. 2 is a schematic depiction of the apparatus and control circuit for practicing the invention.

A transfer apparatus according to the present invention is shown schematically in FIG. 2 in conjunction with a conventional battery grid paster 10, drying oven 15 and a slitter 20. Paster 10 receives battery grids 2 which are then pasted with a suitable battery paste and transferred to an oven conveyor 12 which transports the pasted panels 1 through the drying oven 15. The panel transfer mechanism 25 receives the panels 1 from oven conveyor 12 and transfers them via a transfer conveyor 26 to the slitter 20 where the panels 1 are separated. A first motor 27 drives conveyor 12 and a second motor 29 drives the panel transfer conveyor 26. Motors 27 and 29 are typically induction type electric motors whose speed varies with the driven load.

The transfer apparatus 25 also has a control system 30 associated therewith for controlling the speed of the transfer conveyor 26 relative to the rate at which panels 1 are received from the oven conveyor 12. Basically, the transfer conveyor 26 is operated at a rate of speed which is faster in terms of panels transferred per unit of time as compared to the rate at which panels 1 are arriving from oven conveyor 12 which is driven by the drive motor 27. The control system 30 is provided to coordinate the rate of speed of conveyor 26 by periodically interrupting the power supply to motor 29 for predetermined time periods whereby the drive motor 29 and conveyor 26 will slow momentarily until power is restored. The control system 30 includes a first or paster sensing device 31 for sensing the entry of grids 2 into the paster 10. A second or oven sensing device 33 is provided for sensing the position of panels 1 on the oven conveyor 12, and a third or transfer sensing device 35 is provided for detecting the relative position of transfer lugs 36 affixed to the transfer conveyor 26 for engaging the lugs 6 of pasted panels 1 received from oven conveyor 12. Sensors 31, 33 and 35 are each respectively coupled to a paster control 38, an oven control 39, and a transfer control 40. The paster oven and transfer controls 38, 39 and 40 are coupled to a master control 41 which is coupled to a timer 42 for interrupting power to starter relay 45 of drive motor 29. A signal from the master control 41 activates a timer 42 which interrupts current to starter relay 45 of transfer drive motor 29. A switch 50 may be provided for selecting an automatic mode as shown in FIG. 2 whereby timer 42 is operable in response to the signals from the master controller 41, and a manual or bypass mode in which the motor relay 45 is isolated from the control circuit 30. A switch 51 is also provided for activating paster control 38.

Operation of the transfer mechanism 25 and control mechanism 30 is as follows. Initially, drive motors 27 and 29 are placed in operation to drive the oven conveyor 12 and transfer conveyor 26. As mentioned previously, the speed of the transfer conveyor 26 is set slightly faster than that of the oven conveyor 12. This may be accomplished by any suitable mechanically adjustable drive coupled to motor 29 such as a variable sheeve (not shown). The paster control 38 will be set by switch 51 at which point the system is ready to operate. As grids 2 are introduced to the paster 10, the paster sensor 31 will begin sending pulses to master controller 41. Simultaneously, the transfer detector 35 will begin sensing the passage of lugs 36 on conveyor 26 and generating pulses from the transfer control 40. The master control 41 is arranged so that whenever pulses are simultaneously received from paster control 38 and transfer control 40 or from transfer control 40 and oven control 39, an output pulse will be generated which will activate timer 42 thereby interrupting power to transfer drive motor 29 for a preselected period of time. Thus the speed of transfer conveyor 26 and position of lugs 36 will be adjusted relative to the position of panels being introduced at paster 10. As the panels are pasted and passed through drying oven 15, the panels 1 will pass out on oven conveyor 12 and their position will be sensed by sensor 33. As the first panel is sensed by oven sensor 33, a pulse 52 will reset paster control 38 whereby signals from the paster control 38 are no longer received by the master control 41 which is then responsive to pulses from oven control 39 and from the transfer control 40. Again, whenever the pulses from oven control 39 and transfer control 40 are simultaneously received by the master control 41, the timer 42 will be activated to interrupt power to the motor 29. Thus, the speed of the conveyor 26 is constantly being adjusted responsive to simultaneous or interference signals from the sensors 31, and 35 or 31 and 33 whereby the position of transfer lugs 36 on the transfer conveyor 26 is adjusted relative to panels passing over the oven conveyor 12 thereby enabling a smooth transfer of panels from the oven conveyor 12 to the transfer conveyor 26 for subsequent transfer to the slitter assembly 20. The foregoing description is merely intended to set forth the basic concept of the present invention and a more detailed description of the apparatus itself follows.

Figure 3:
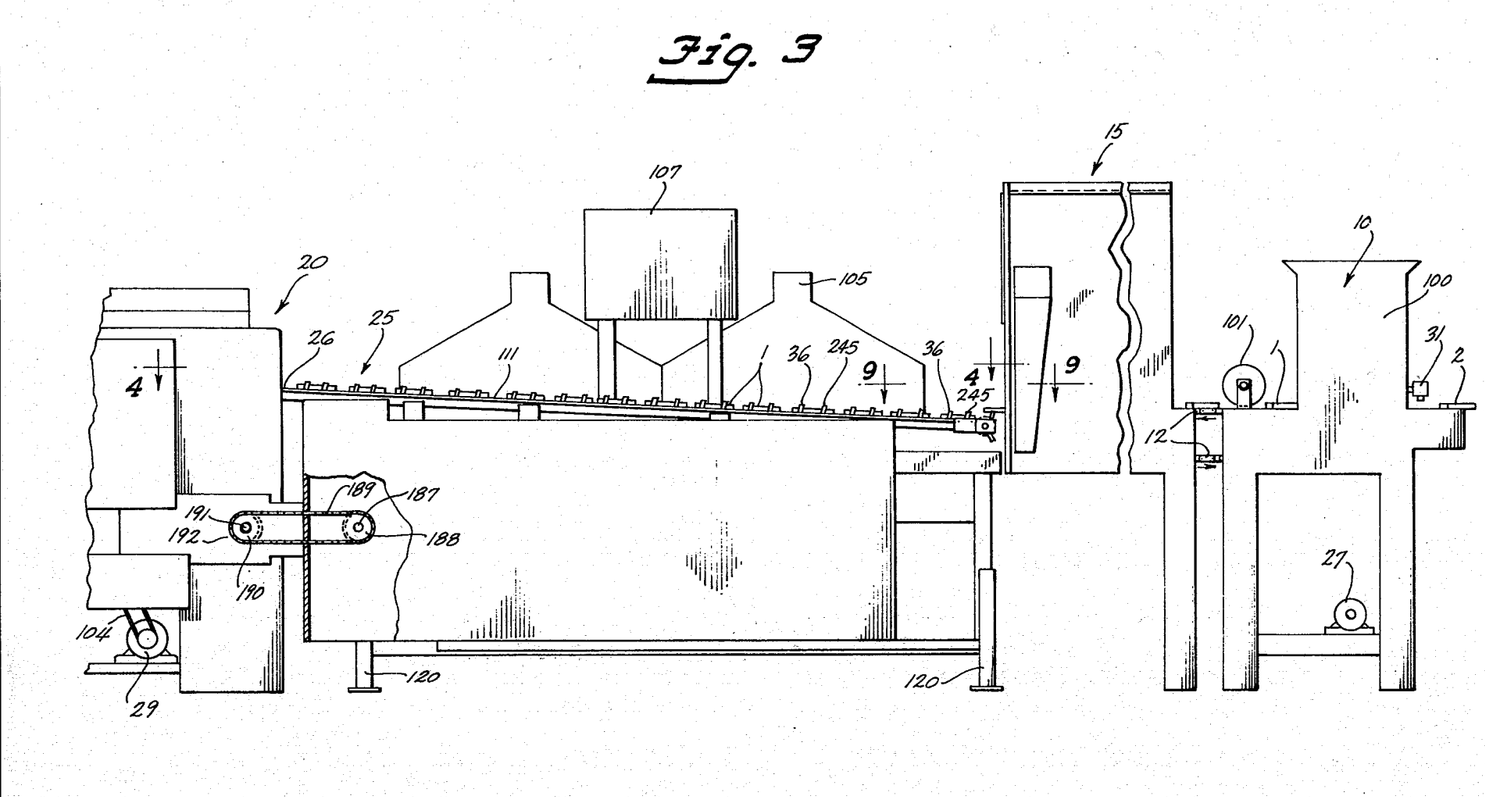
FIG. 3 is a front elevational view of the apparatus according to the invention.

Turning now to FIG. 3, an apparatus for practicing the present invention is shown. The apparatus generally includes a conventional pasting machine 10, a drying oven 15, a transfer apparatus 25 and a slitting device 20 as hereinbefore mentioned. Paster 10 may be of any conventional construction and includes a hopper 100 for containing battery paste to be applied to battery grids 2 which are fed into the front of paster 10. The paster may also include a resilient rotatably mounted roll 101 at the outlet end of the paster for compacting and smoothing the pasted panels 1. A drive motor 27 is also included for driving oven conveyor 12 which conveys the panels 1 from the paster through the drying oven 15. The drive mechanism is not shown as any conventional drive system will suffice. Paster 10 has a sensor 31 which may be mounted near the paster entrance for sensing entry of grids 2.

The panels 1 proceed from the paster 10 and are conveyed by oven conveyor 12 in the direction indicated by arrow 102 through the drying oven 15 which is coupled to the outlet side of the paster 10. Any conventional drying oven may be utilized so that oven 15 is merely depicted generally.

Slitter 20 is provided for receiving panels 1 from the drying oven 15 via transfer mechanism 25. The slitting apparatus is of conventional manufacture, well known in the art, and contains cutting blades (not shown) for dividing the pasted panels 1 along edge 5. Slitter 20 has a drive motor 29 coupled by a belt to a variable speed pully (not shown) which drives a gear reducer (not shown) whose output is coupled to a drive chain 104 for providing motive power to conveyor 26 for the slitting operation. Slitter 20 is of conventional construction with the exception that the slitter drive motor 29 also provides the motive power to the transfer mechanism conveyor 26 unlike conventional slitters having separate slitter conveyors. This aspect of the slitter arrangement will be discussed in more detail later.

As may also be seen in FIG. 3, a transfer mechanism 25 is situated between the exit end of the oven 15 and the slitter 20 and includes a conveyor 26 for transferring the panels 1 to slitter 20. Vacuum plenum chambers 105 may be provided adjacent conveyor 26 having openings not shown for withdrawing lead laden vapors and small particles of battery paste from the vicinity of the apparatus 25. Suitable duct work, not shown, may also be provided for connecting the vacuum plenum chambers 105 to a suitable vacuum source for conveying the vapors and loose particles away for disposal. Such vacuum devices are provided for reducing airborne pollution and are well known in the art. Additionally, a control box 107 may be provided on the transfer apparatus 25 for housing suitable electrical controls for the control system.

Figure 4:
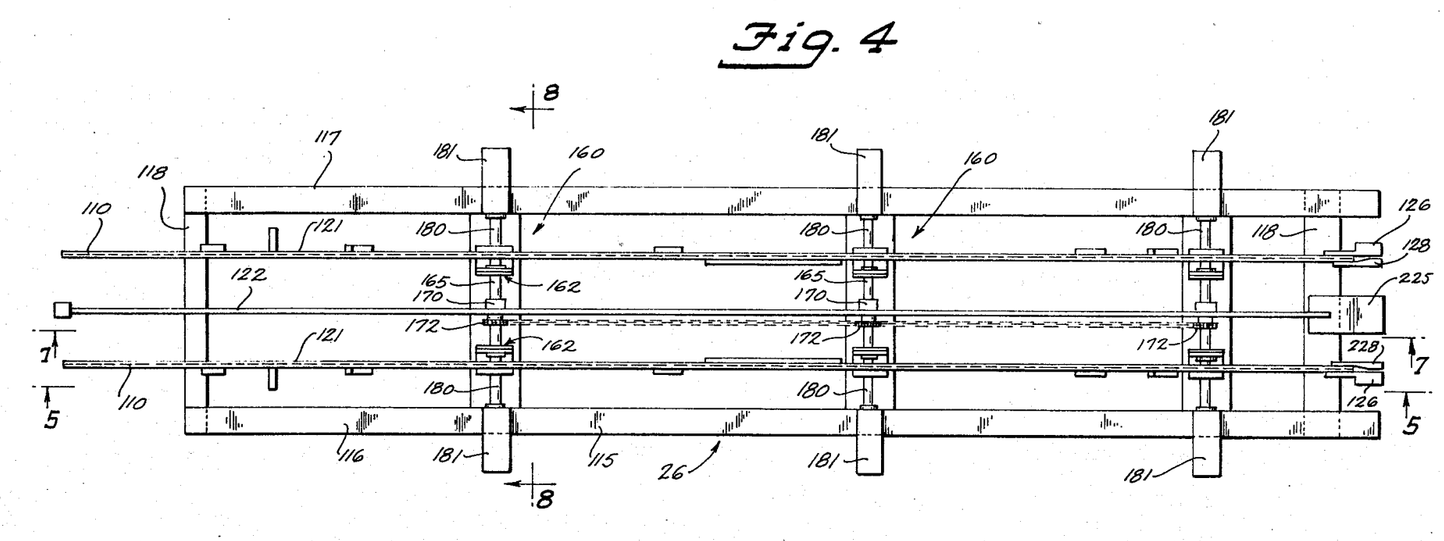
FIG. 4 is a view taken along line 4—4 of FIG. 3.
Figure 5:
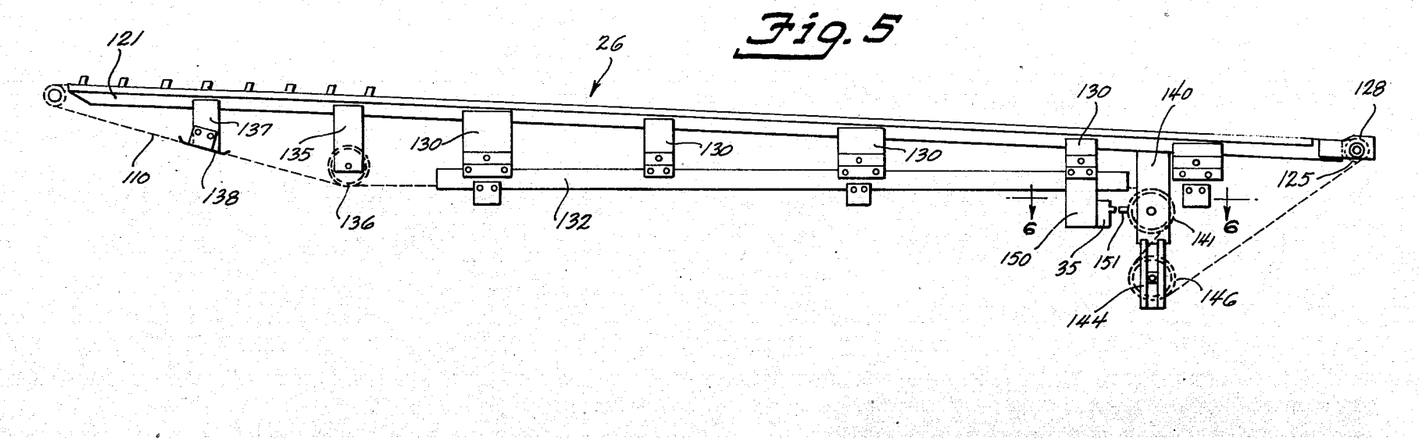
FIG. 5 is a view taken along line 5—5 of FIG. 4.

The construction of conveyor 26 of the transfer mechanism 25 is best seen in FIGS. 3, 4 and 5. The transfer conveyor 26 basically comprises a pair of parallel chains 110 which have an upper run 111 extending to a slight incline upwardly from a point adjacent the oven 15 and on to the slitter 20. Chains 110 are supported on a framework assembly 115 which includes stationary side beams 116 and 117 and cross beams 118. The framework 115 may be supported on suitable legs 120 to provide the correct elevation relative to the oven 15 and slitter 20. Between the side beams 116 and 117 a pair of longitudinally extending parallel guide rails 121 are provided for supporting the upper run 111 of chain assembly 110. Additionally, a support rod 122 extends parallel to guide rails 121 and midway between them for supporting the central portion of the panels 1 carried by chain 110. As is best seen in FIG. 5, the ends of the guide rails 121 adjacent the exit end of oven 15 each have a sprocket 125 rotatably mounted therein and over which the chains 110 pass. Each sprocket 125 is rotatably journaled in a suitable bearing (not shown) in a bearing block 126. Additionally, adjacent to the sprockets 125, a stationary panel support 128 is provided on each guide rail which has a portion extending upwardly and over a portion of the sprockets 125 and chains 110. The purpose of the panel supports 128 will be described hereinafter. Along the length of each guide rail 121, a plurality of downwardly extending plates 130 are attached to the guide rails 121 and are coupled to a pair of lower guide rails 132 for guiding the lower run of chains 110. Near the slitter end of the lower guide rails 132, a pair of gussets 135 are provided which extend downwardly from the guide rails 121 and support idler sprockets 136 which are suitably rotatably mounted therein. Further upstream, relative to motion of upper run 111, from the idler 136, another pair of gussets 137 are attached to guide rails 121 and support skid plates 138 which contact the upper surface of the lower run of chains 110 for damping vibrations in the chain 110 as it moves through the apparatus. At the down stream end of the rails 121, another pair of gusset plates 140 are provided which contain rotatably mounted idlers 141. The lower end of gusset 140 has a generally vertically extending slot 144 formed therein. A second idler sprocket 146 is supported within the slot 144 and any suitable means are provided for rotatably supporting the sprocket 146 within the slot 144. The sprocket 146 is adjustable vertically up and down within the slot 144 for adjusting tension of the chains 110. As is seen in FIG. 5, the chains 110 are passed over idler sprockets 125, down and around sprockets 146 and up and over sprocket 141 and then pass along the lower guide rails 132 toward the slitter 20.

Figures 6, 8:
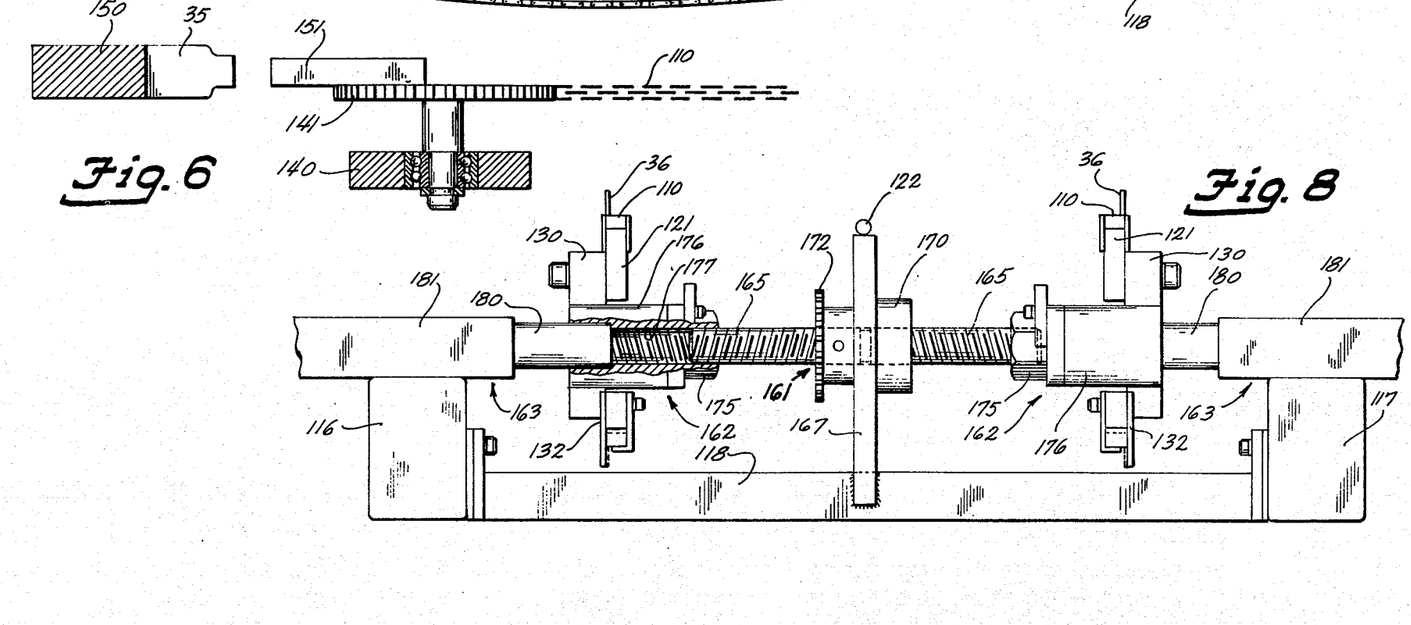
FIG. 6 is a view taken along line 6—6 of FIG. 5.
FIG. 8 is a view taken along line 8—8 of FIG. 4.

Referring now to FIGS. 5 and 6, a sensor 35 is located beneath the guide rails 132 and 121 and is supported from a bracket 150. Sensor 35 is located proximate to sprocket 141 and a radially extending spoke 151 is attached to sprocket 141 and rotates therewith. The sprocket 141 has a pitch line circumference equal to the length of space between dogs 36 on the chains 110 which carry the panels along the top of the transfer apparatus. It will thus be appreciated that as the sprocket 141 makes one revolution, chain 110 will advance a distance equal to the spacing between adjacent pairs of dogs 36. Accordingly with each revolution, the spoke 151 will pass in the vicinity of sensor 35, which may be of any conventional type proximity sensor activated by the passage of the spoke 151. Further details of the operation of the sensor in conjunction with the control system 30 will be explained in detail later. Obviously other types of sensors could also be used such as a photoelectric eye or a fluidic sensor for example.

Referring generally to FIGS. 3, 4, 5, 7 and 8, means are provided for adjusting the horizontal distance between the upper and lower guide rail pairs 121 and 132 to accommodate panels 1 of varying widths. As is best seen in FIG. 4 and FIG. 8, three adjusting mechanisms 160 are provided within the framework 115. Since the adjusting mechanisms 160 are all identical in function and basic construction, only one need be described. The adjusting mechanisms 160 each basically comprise a rotatable screw assembly 161 which is threadably engaged in horizontally opposed nut assemblies 162 which are in turn coupled to the pairs of guide rails 121 and 132 at plates 130. Additionally, bearing supports 163 are provided on each side for vertically supporting the nut assemblies 162 as well as the guide rails 121 and 132. The screw assembly 161 comprises a threaded shaft 165 which passes through a stationary support bracket 167 midway between the guide rails 121 and 132. The support bracket 167 may be suitably affixed to a cross beam 118 within the framework 115. A collar 170 and a sprocket 172 are attached to screw 165 on either side of the support bracket 167 to prevent axial motion of the screw relative to the support bracket 167. Sprocket 172 is engaged by a flight chain for rotating the screw member 165 in a manner to be described hereinafter. Each end of screw member 165 is threadably engaged within a nut assembly 162 whereby rotation of the screw 165 will cause the nut assemblies 162 to advance or retreat axially along the screw 165. The ends of the screw member 165 are threaded in opposite directions, one left hand, the other right hand, so that rotation of the screw causes the nut assemblies 162 to either advance toward one another simultaneously or to retreat relative to one another simultaneously. Each nut assembly 162 may be seen to comprise a part of a plate 130 coupled to the top guide rail 121 and bottom rail 132. The nut assemblies 162 each include a threaded head or nut 175 attached to a hollow body member 176 which has an aperture 177 in general alignment with screw member 165 for receiving the end of the screw member 165 as the nut assemblies 162 is advanced axially along the screw 165. The opposite end of the housing 176 is attached to a shaft 180 which is slidably supported in a stationary bearing support or housing 181 attached to side members 116 and 117. It will thus be seen that rotation of the sprocket 172 causes a corresponding rotation of the screw member 165 which in turn advances or retracts the nut assemblies 162 thereby causing a closing or opening of the horizontal distance between upper and lower guide rails 121 and 132. The entire assembly is rigidly supported in framework 115 by virtue of the central support bracket 167 and the bearing assemblies 163.

Figure 7:
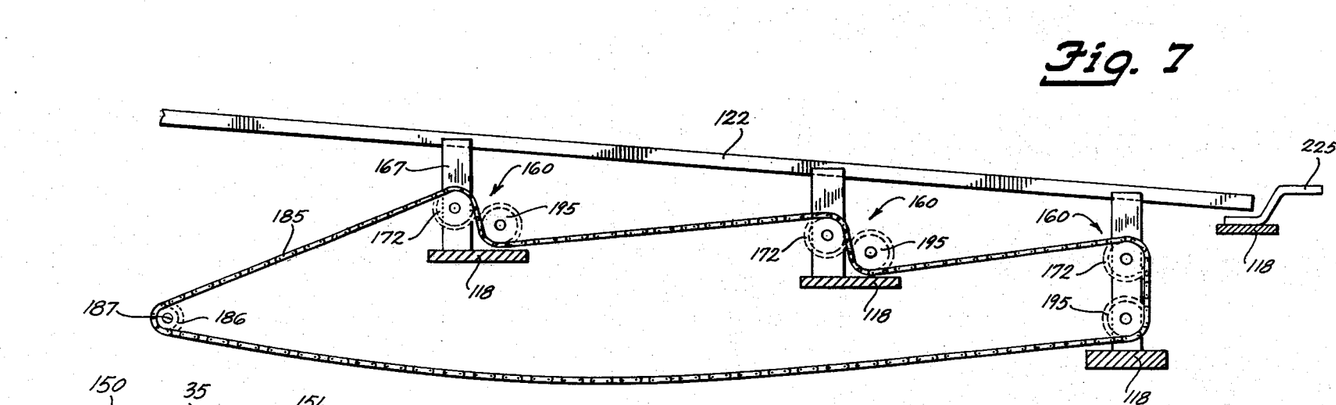
FIG. 7 is a view taken along line 7—7 of FIG. 4.

The means for driving the adjustment mechanisms 160 is best seen in FIGS. 3 and 7. An endless chain 185 is provided which is wound over each of the drive sprockets 172 and chain 185 is driven by a sprocket 186 which is rotatably mounted on a shaft 187 supported on bearings (not shown) within the framework 115. Shaft 187 also has a second drive sprocket 188 which is driven by an adjusting chain 189 which is in turn suitably coupled to a sprocket 190 rotatably mounted on an adjusting shaft 191. A hand wheel 192 is provided which is coupled to shaft 191 and is accessible from outside the slitter 20 whereby rotation of hand wheel 192 causes shaft 191 and sprocket 190 to rotate in turn causing motion of adjusting chain 189. The movement of chain 189 in turn rotates sprocket 188 which turns shaft 187 and moves the drive chain 185. Motion of chain 185 rotates the sprockets 172 simultaneously thereby causing the horizontal adjustment of the spacing of the guiderails as hereinbefore described. As seen in FIG. 7, each of the adjusting mechanisms 160 may include a rotatably mounted idler sprocket 195 contacting chain 185 and attached to the central support brackets 167, however, other suitable chain arrangements will be readily apparent to those skilled in the art.

Figure 9:
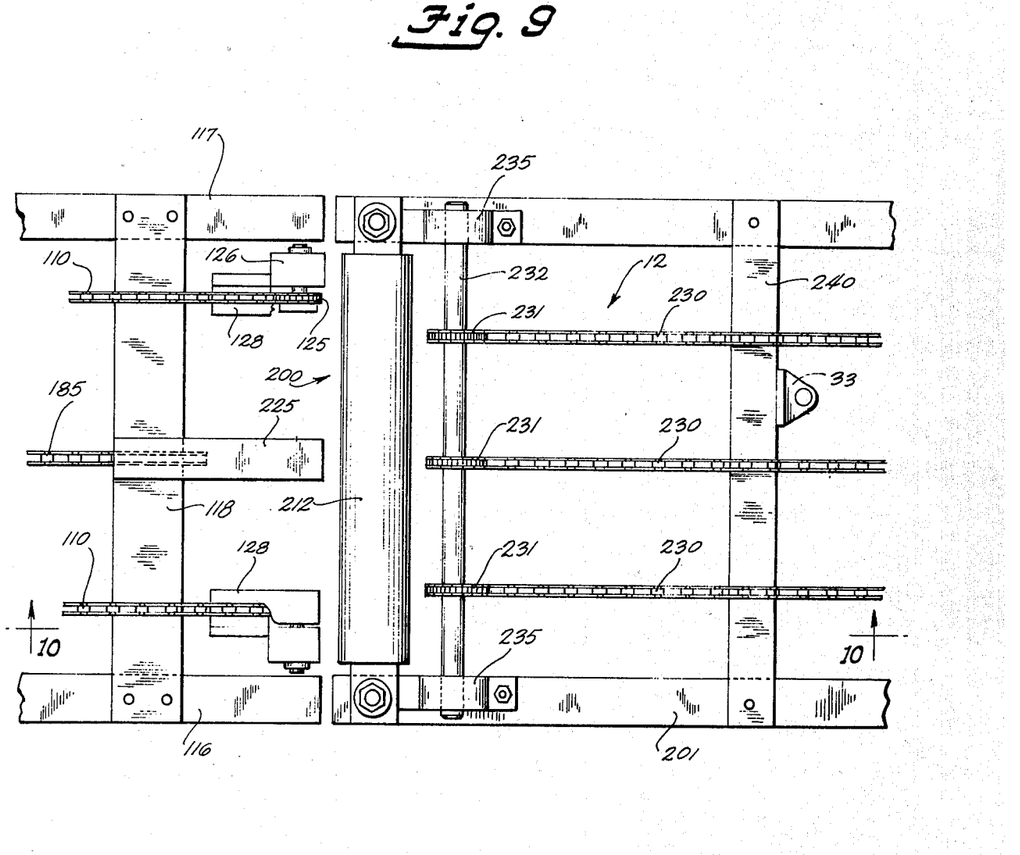
FIG. 9 is a view taken along line 9—9 of FIG. 3.
Figure 10:
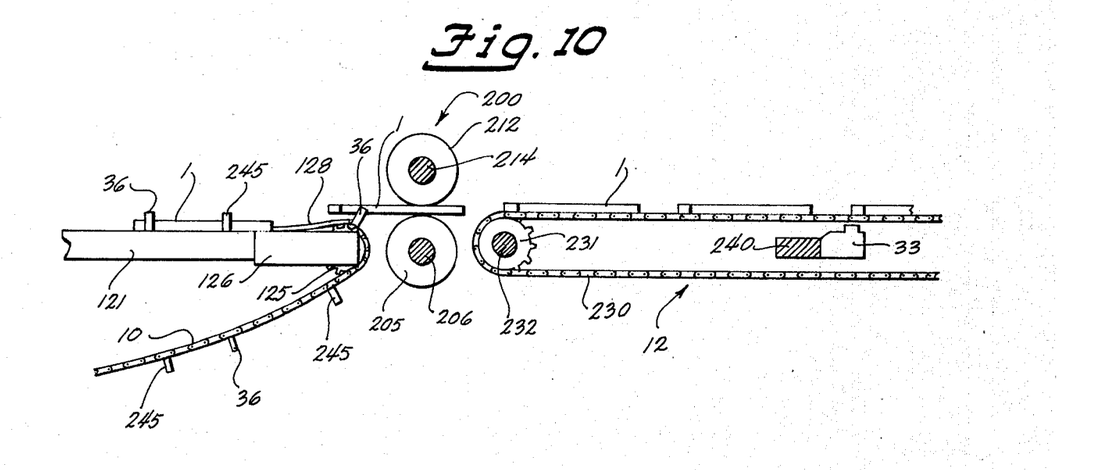
FIG. 10 is a view taken along line 10—10 of FIG. 9.

The junction of the transfer apparatus 25 with the exit end of the oven assembly 15 is best seen in FIGS. 9 and 10. An accelerator roll assembly 200 is provided between the end of the oven conveyor assembly 12 and the beginning of the transfer assembly conveyor 26. The accelerator roll assembly 200 is provided to receive the panels 1 from the oven conveyor assembly 12 and accelerates the panels along the direction of panel transfer onto support members 128 of the transfer conveyors 26 until the panels are picked up by lugs 36 of the transfer conveyor chain 110. The accelerator apparatus is suitably supported on structural side members 201 and 202 of the oven assembly 15.

The accelerator roll assembly 200 comprises a lower resilient roller 205 which extends transversely to the direction of panel transfer 102 along a horizontal axis parallel to the plane of the panels 1. The lower roller 205 has an integral shaft 206 extending from either end which is suitably supported in bearings (not shown) at each end of the roller 205. Accelerator apparatus 200 also includes an upper resilient idler roll 212 having its axis extending parallel to roll 205 and positioned vertically above roller 205. The idler roller 212 also has an integral shaft 214 extending from either end which is also suitably supported in bearings (not shown). The resilient engagement of roller 212 with the panels 1 ensures a degree of frictional engagement between the panels 1. The driven roller 205 is driven at a peripheral speed in excess of oven conveyor 12 to accelerate the panels 1 onto the support members 128 of the transfer apparatus 25. As seen in FIGS. 7 and 9, a central support bracket 225 may be provided midway between support members 128 and comprises a generally S-shaped flat member having an upper surface extending generally in horizontal alignment with the tops of support members 128. The bracket 225 is curved downwardly and horizontally for attachment by any suitable means to cross beam 118 of the transfer apparatus 25 beneath the end of central rod member 122. The support bracket 225 aids in supporting the central portion of panels 1 as they are discharged from accelerator rollers 200 and while awaiting pickup by transfer chain 110.

As seen in FIGS. 9 and 10, the conveyor 12 of the oven 15 may comprise a plurality of driven chain members 230 which extend parallel to each other in a spaced relationship and pass over sprockets 231 attached to a shaft 232 which is suitably journaled in bearing assemblies 235 attached to side members 201 and 202 of the oven assembly 15. Prior to the end of the conveyor chains 230, a cross member 240 is provided which extends across side members 201 and 202 and supports a sensor 33 beneath the path of panel travel on conveyor 12. Sensor 33 may be a proximity sensor, or any other suitable sensing device as previously mentioned, for detecting the passage of the panels over the sensor 33 in which is coupled to the control system 30 as generally described earlier. As seen in FIG. 10, panels traveling along conveyor 12 pass over sensor 33 and are directed to the end of conveyor assembly 12 into the space between rollers 205 and 212 of the accelerator roller assembly 200. The driven roller 205 then imparts an accelerative force to the panels 1 propelling them onto the support members 128 and 225. Panels 1 rest on the supports 128 and 225 until dogs 36 of transfer chain 110 engage the lugs 6 of the panels 1. As also appears in FIG. 10, intermediate successive pairs of pickup dogs 36 on chains 110, a second pair of dogs 245 are provided for engaging the sides of the panels 1 to provide horizontal stability of the panels as they move along the chain 110.

Figure 11:
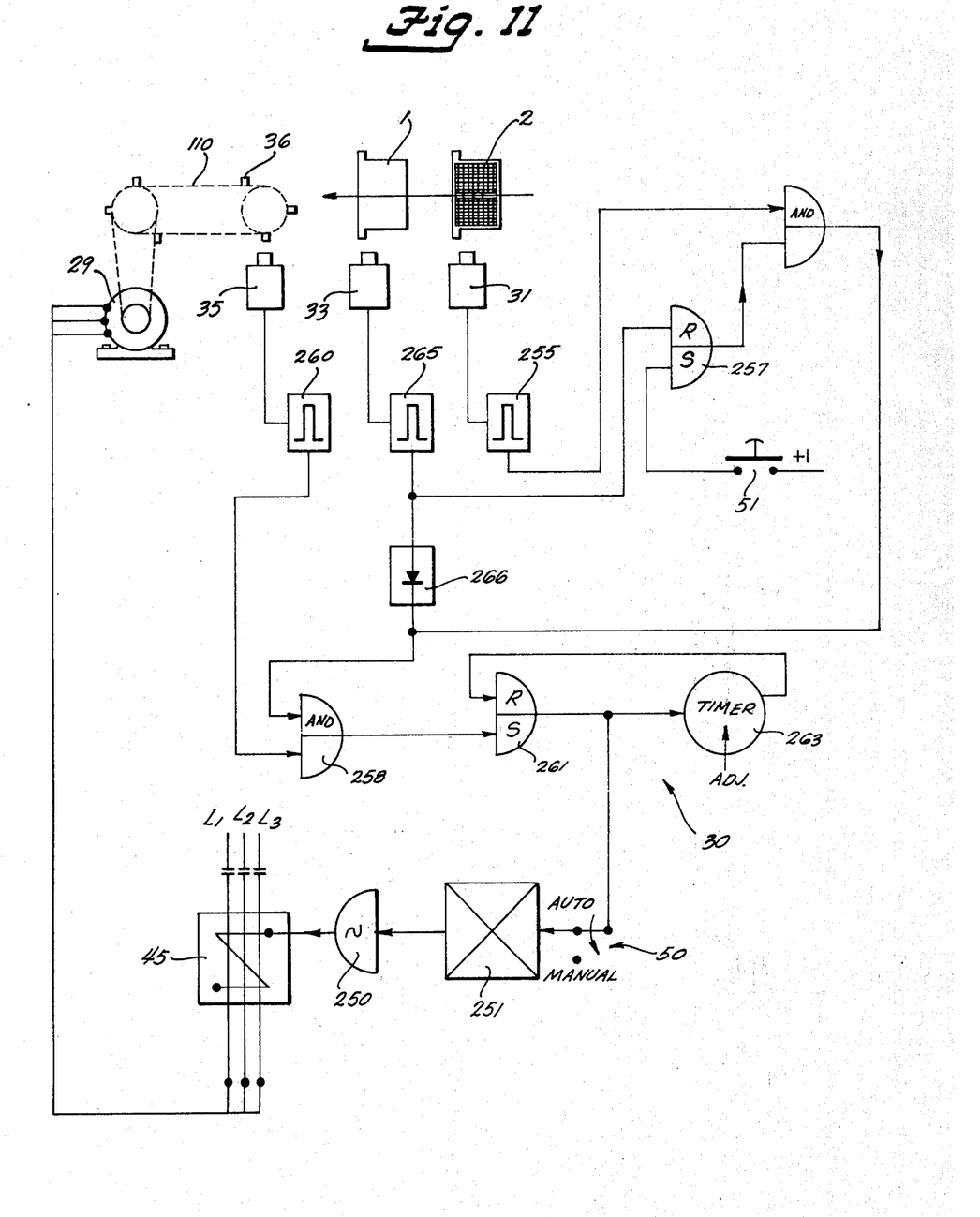
FIG. 11 is a schematic diagram of control system according to the invention.

The control system 30 associated with the apparatus is shown schematically in FIG. 11. The control system 30 is depicted in the form of a solid state logic diagram and will be described hereinafter, however, it will be readily understood by those skilled in the art that other equivalent control systems could be employed. For example, equivalent mechanical devices could be utilized or a fluidic type control system could also be employed. As seen in FIG. 11, the transfer mechanism drive motor 29 has a motor start relay 45 which is energized through a static switch 250. The static switch 250 is coupled to a NOT module 251 which provides an input signal to the static switch 250 as long as the NOT module is not receiving an input pulse. Whenever an input pulse is provided to the NOT module 251, the output of the NOT module 251 is terminated as long as the input signal remains. A bypass switch 50 may be provided for disconnecting NOT module 251 for manual operation.

The input signal to the not module 251 is provided through the paster, oven and transfer sensors 31, 33 and 35 as will be explained hereinafter. The paster sensor 31 generates a square wave pulse as a grid 2 passes beneath it. The square wave pulse from the paster sensor 31 is passed to a paster signal conditioner 255 which converts the pulse to a discrete pulse which is directed to a paster AND module 256. The paster AND module 256 also receives an output pulse from a retentive memory module 257 which is activated or set by momentary push button switch 51. When the paster AND module 256 receives simultaneous pulses from the memory module 257 and from the paster signal conditioner 255, an output pulse is generated which is directed to a control AND module 258. Simultaneously, the transfer mechanism sensor 35 generates pulses conforming to the passage of lugs 36 for transferring panels along the conveyor chain 110. The pulses from the transfer sensor 35 are directed through a transfer signal conditioner 260 which converts the signal to a discrete pulse directed to the second input of the control AND module 258. Whenever signals from both the paster and transfer conditioners 255 and 260 are received simultaneously by control AND module 258, an output pulse is directed to and sets a second memory module 261 which then produces an output pulse which is directed to the NOT module 251 thereby discontinuing the output from the NOT module 251 which in turn deactivates static switch 250 and interrupts power to the drive motor 29. The output from the second memory module 261 is also directed to a timer 263 which, after a predetermined time period generates an output pulse to reset the module 261 and thereby discontinue the output. Discontinuance of the output from the second memory module 261 deactivates the NOT module 251 and restores power to the motor 29. Thus power to the motor 29 is interrupted upon simultaneous signals from signal conditioners 255 and 260 but the interruption will last only as long as the period set in the timer 263. As the panels 1 proceed along the oven conveyor, they eventually pass in the vicinity of oven sensor 33 which generates an output pulse similar to that of the paster and transfer sensors 31 and 35. The output from the oven sensor 33 is also directed through an oven signal conditioner 265 whose output passes through an isolator 266 to the control AND module 258. The signal from oven conditioner 265 also acts to reset the paster memory module 257 thereby discontinuing the output to the paster AND module 256 effectively isolating the signals from the paster detector 31 from the remaining portions of the circuitry. Isolator 266 acts in a manner similar to a check valve in that current may only flow from oven signal conditioner 265 to the control AND module 258 whereby the output from the paster AND module 256 will be prevented from activating the reset portion of the paster memory module 257.

It will thus be appreciated that the control system is initially activated by depressing momentary push button switch 51 to set the paster memory module 257. At this point, grids 2 activating the paster sensor 31 will generate signals from the paster signal conditioner 255 and whenever the signals, which pass through the paster AND module 266, occur at the same time as pulses from the transfer sensor 35 and transfer signal conditioner 260, the control AND module 258 will send an output to the second memory module 261 thereby interrupting power to motor 29 via NOT module 251. This interruption will occur for a finite time period determined by the timer 263. As panels 1 which have been pasted reach the oven sensor 33, pulses will be generated which will reset the paster memory module 257 thereby removing the input to the paster AND module 256 whose output is then zero. The pulses from oven conditioner 265 will also be directed to the control AND module 258. At this point, the panels 1 will be close to transfer to the transfer mechanism 25 and the drive motor 29 will be interrupted only upon signal interference between the transfer conditioner 260 and the oven conditioner 265. The simultaneous signals will pass through AND module 258 and momentarily interrupt power to the drive motor 29 as previously described.

While the control system has been described in terms of solid state arrangement, various mechanical equivalents could be utilized. For example, the signal conditioners operate in a manner similar to mechanical timers. The AND module function similar to relays and the memory modules are the equivalent of latching relays. The NOT module is equivalent of a contact and the static switch 250 is similar to a contactor. Other equivalent systems could be devised as long as the logic is equivalent to that set forth herein.

While one embodiment of the invention has thus been described, the invention is not to be limited thereby but is to be taken solely by an interpretation of the claims which follow.

We claim:

1. Apparatus for transferring battery panels from a source of moving panels to a destination, the apparatus comprising:
   first conveyor means for receiving the moving panels, the conveyor means including means for engaging the panels and traversing the panels to the destination;
   prime mover means for driving the first conveyor means at a linear speed in excess of the linear speed of panels at the source; and
   control means for adjusting the speed of the first conveyor means responsive to the position of successive panels at the source of panels so that the position of the engagement means relative to the panels at the source is adjusted to receive the panels on said first conveyor means; the control means comprising sensor means for detecting the position of panels at the source relative to the engagement means, and means for momentarily interrupting the operation of the prime mover to adjust the relative position of the engagement means and panels at the source.

2. Apparatus as defined in claim 1 wherein:
   the first conveyor means extends generally horizontally and the panels are transferred in a generally horizontal position.

3. Apparatus as defined in claim 2 wherein:
   the first conveyor means comprises a pair of laterally spaced parallel chains; and
   the means for engaging the panels comprise a plurality of spaced dogs affixed to said chains, the dogs being arranged in laterally adjacent pairs on the chains.

4. Apparatus as defined in claim 3 wherein:
   the first conveyor means includes support means disposed between the chains for supporting the center of said panels.

5. Apparatus as defined in claim 4 wherein:
   the source of moving panels comprises a second conveyor; and including
   means for receiving panels from the second conveyor and transferring them to the first conveyor means.

6. Apparatus as defined in claim 5 including:
   paster means for receiving battery grid panels and pasting them to form said battery panels, the second conveyor being arranged to receive the pasted panels from the paster means.

7. Apparatus as defined in claim 6 including means associated with the second conveyor for drying said panels.

8. Apparatus as defined in claim 7 wherein the destination comprises means for dividing said battery panels to form battery plates.

9. Apparatus as defined in claim 8 wherein:
the control means comprises first sensor means associated with the paster means for detecting the entry grid panels into the paster, second sensor means associated with the second conveyor for detecting the passage of panels along the second conveyor, and third sensor means for detecting the position of the dogs on the conveyor.

10. Apparatus as defined in claim 3 including means for adjusting the lateral spacing of the chains.

11. Apparatus as defined in claim 3 wherein:
the source of moving panels comprises a second conveyor; and including
means for receiving panels from the second conveyor and transferring them to the first conveyor means.

12. Apparatus as defined in claim 5 including means for adjusting the lateral spacing of the chains.

13. Apparatus as defined in claim 12 including:
paster means for receiving battery grid panels and pasting them to form said battery panels, the second conveyor being arranged to receive the pasted panels from the paster means.

14. Apparatus as defined in claim 13 including means associated with the second conveyor for drying said panels.

15. Apparatus as defined in claim 14 wherein the destination comprises means for dividing said battery panels to form battery plates.

16. Apparatus as defined in claim 15 wherein:
the control means comprises first sensor means associated with the paster means for detecting the entry grid panels into the paster, second sensor means associated with the second conveyor for detecting the passage of panels along the second conveyor, and third sensor means for detecting the position of the dogs on the conveyor.

17. Apparatus as defined in claim 16 wherein:
the control means includes means for isolating the first sensor upon actuation of the second sensor and means for momentarily interrupting the operation of the prime mover upon the receipt of simultaneous signals from the second and third sensors.

18. Apparatus as defined in claim 17 wherein:
the control means includes adjustable timer means for selectively varying the duration of momentary interruption of the operation of the prime mover.

19. Apparatus as defined in claim 18 including means for supporting the panels adjacent the end of the first conveyor means until they are engaged by a pair of the dogs.

20. Apparatus as defined in claim 2 wherein:
the source of moving panels comprises paster means for applying paste to battery grids, and means for transporting pasted panels from the paster to the first conveyor means.

21. Apparatus as defined in claim 20 wherein:
the control means comprises first sensor means associated with the paster means for detecting the entry grid panels into the paster, second sensor means associated with the means for transporting panels to the first conveyor and third sensor means for detecting the position of panel engaging means on the first conveyor.

22. Apparatus as defined in claim 21 wherein:
the control means includes means for isolating the first sensor upon actuation of the second sensor and means for momentarily interrupting the operation of the prime mover upon the receipt of simultaneous signals from the second and third sensors.

23. Apparatus as defined in claim 22 wherein:
the control means includes adjustable timer means for selectively varying the duration of momentary interruption of the operation of the prime mover.

24. Apparatus as defined in claim 1 wherein:
the first conveyor means comprises a pair of laterally spaced parallel chains; and
the means for engaging the panels comprise a plurality of spaced dogs affixed to said chains, the dogs being arranged in laterally adjacent pairs on the chains.

25. Apparatus as defined in claim 1 wherein:
the source of moving panels comprises a second conveyor; and including
means for receiving panels from the second conveyor and transferring them to the first conveyor means.

26. Apparatus as defined in claim 25 wherein the means for receiving panels comprises accelerator roll means for accelerating the speed of the panels relative to the speed of the second conveyor.

27. Apparatus as defined in claim 26 including support means adjacent the accelerator roll means for supporting the panels adjacent the end of the first conveyor means until the engaging means contact the panels.

* * * * *